United States Patent [19]
van Hooreweder

[11] Patent Number: 5,734,359
[45] Date of Patent: Mar. 31, 1998

[54] DISPLAY SYSTEM INTENDED TO BE ATTACHED TO THE HEAD OR TO A HELMET, AND A HELMET PROVIDED WITH SUCH A DISPLAY SYSTEM

[75] Inventor: Godwin J. O. G. van Hooreweder, Brugge, Netherlands

[73] Assignee: B.V. Optische Industrie "De Oude Delft", Delft, Netherlands

[21] Appl. No.: 307,608

[22] PCT Filed: Sep. 8, 1994

[86] PCT No.: PCT/NL94/00219

§ 371 Date: Oct. 31, 1994

§ 102(e) Date: Oct. 31, 1994

[87] PCT Pub. No.: WO96/01439

PCT Pub. Date: Jan. 18, 1996

[30] Foreign Application Priority Data

Jul. 1, 1994 [NL] Netherlands ................ 9401109

[51] Int. Cl.⁶ .................... G02B 23/12; G02B 27/00
[52] U.S. Cl. ........................... 345/8; 359/630
[58] Field of Search ..................... 345/153, 7–9, 345/32, 1–6; 359/13–15, 23–24, 629–631, 146

[56] References Cited

U.S. PATENT DOCUMENTS

| | | | |
|---|---|---|---|
| 4,468,101 | 8/1984 | Ellis . | |
| 4,968,123 | 11/1990 | Fournier, Jr. et al. | 359/630 |
| 4,970,589 | 11/1990 | Hanson et al. | 359/146 |
| 5,079,416 | 1/1992 | Filipovich . | |
| 5,229,598 | 7/1993 | Filipovich . | |
| 5,257,094 | 10/1993 | Larussa | 359/13 |
| 5,418,584 | 5/1995 | Larson | 359/629 |
| 5,515,070 | 5/1996 | Kawada | 345/8 |
| 5,537,253 | 7/1996 | Cox et al. | 359/630 |
| 5,539,578 | 7/1996 | Togino et al. | 359/630 |

FOREIGN PATENT DOCUMENTS 0252200  1/1988  European Pat. Off. .

*Primary Examiner*—Mark R. Powell
*Attorney, Agent, or Firm*—Louis E. Marn

[57] ABSTRACT

There is disclosed a display system to be attached to a head of the user or to a helmet to be positioned on the head of the user. The display system comprises an image intensifier unit having an input for receiving an image and an output for retransmitting the image with enhanced intensity and within a predetermined first frequency band. The display system further comprises an eye piece composed of a first and second transparent reflecting element having angle- and frequency-dependent reflectants and transmittance properties wherein such properties in combination with the first frequency band result in an intensified image emerging via the eye piece. The display system further is provided with an image display device for transmitting a visible video image in the direction of the eye piece. The properties of the eye piece in combination with the second frequency band results in a video image emerging via the eye piece within a predetermined second frequency band in a direction which is virtually identical to that of the intensified image.

20 Claims, 6 Drawing Sheets

DISPLAY SYSTEM INTENDED TO BE ATTACHED TO THE HEAD OR TO A HELMET, AND A HELMET PROVIDED WITH SUCH A DISPLAY SYSTEM

BACKGROUND OF THE INVENTION

1. Field of the Invention

The invention relates to a display system intended to be attached to the head or to a helmet, comprising at least an image intensifier unit having an input on which an image can be projected and an output which retransmits the projected image with an enhanced intensity and within at least a predetermined first frequency band, and an eyepiece which is composed of a first and second transparent reflecting element having angle- and frequency-dependent reflectance and transmittance properties, said properties in combination with the said first frequency band resulting in the intensified image emerging via the eyepiece in the direction of the eye.

2. Description of the Prior Art

Such a display system is disclosed by the European Patent Application 0 252 200. These display systems are used, inter alia, for the helmets of pilots especially of military airplanes and helicopters. Herein, a free direct-vision image is blended with a night image, the night image being an intensified image. For the purpose of obtaining a bright image of an environment whose light intensity is low, this known display system provides a user with an excellent bright image having a high resolution. Even if the intensity of the ambient light increases, a bright image is obtained as a user can also perceive the environment directly. A user wearing such a system is therefore able to use it to observe in daylight, dim light or in the dark, without the need of putting the helmet on or taking it off. This means that the ambient light is projected by the display system directly in the direction of the eye. A head attachment system or helmet provided with such a display system has the additional advantage that a centre of gravity which is ideally positioned for the user can be achieved.

The need has now arisen for a display system in which it is possible to blend day image, night image (intensified image) as well as video image with information such as angle data or distance data or other data. At the same time, it is also desirable for the advantages of the display system according to the European Patent Application 0 252 200 to be retained as well.

To this end, the display system according to the invention is characterized in that the display system is further provided with an image display device which transmits a visible video image in the direction of the eyepiece, the said properties of the eyepiece resulting in the video image emerging within a predetermined second frequency band via the eyepiece in the direction of the eye.

A user, such as, for example, a pilot, who is wearing a helmet provided with such a display system thus in principle need not turn his eyes away from the environment in order to observe the required armament system information or other information. The information coming from the image display device can, after all, be displayed in the field of vision of the pilot, while he, for example, is looking outwards straight ahead.

The European Patent Application 0 475 790 discloses a display system in which likewise day image, night image and video image are blended. In this case, however, use is made of only one (holographic) element to blend a video image and a night image. These two blended images are then projected, together with a daylight image, through combination optics in the direction of the eye. A drawback of such a system is that all three images are necessarily always displayed at an identical distance and are always simultaneously in focus for a user. This can have a particularly confusing effect. The European Patent Applications 0 286 496 and 0 288 365, and the U.S. Pat. No. 5,257,094 likewise disclose display systems in which images are blended with one another. In these systems, however, only two instead of a possible three images are blended with one another in each case.

SUMMARY OF THE INVENTION

A particular embodiment of the invention is characterized in that the intensified image is, successively, reflected by the first element and reflected and collimated by the second element, in order to be transmitted through the first element. In this case, the video image is reflected by the first element in the same direction as that in which the intensified image emerges. More in particular, the intensified image and the video image, respectively, impinge on the first element on different sides of the first element. According to a very advanced embodiment, the angle of incidence of the intensified image differs from the angle of incidence of the video image on the first element.

An optical system operating in this way can be implemented, in particular, if the first frequency band comprises, at least in the main, frequencies different from those of the second frequency band. The first frequency band comprises, for example, at least mainly light of greenish colour, and the second frequency band comprises, at least mainly, light of reddish colour. Thanks to such a choice of frequencies, the abovementioned reflections and transmissions of the first and second element can be effected. Moreover, it is very advantageous for a user that the video image is perceived in a colour different from that of the night image. Confusion between the two images is thus precluded, while the colour contrast promotes separate perception of each of the two images.

The display system according to the invention in addition has the advantage that a daylight image is successively transmitted through the first and second element and emerges from the eyepiece in a direction identical to that of the intensified image and the video image. This means that the day image can be observed directly.

In particular, the first element comprises at least a holographic layer. It is also possible, however, for the first element to comprise at least a multilayer interference filter. The second element preferably at least comprises a holographic concave layer and forms a concave collimating holographic mirror by means thereof. In addition it is possible, however, for the second element to comprise a curved multilayer interference filter.

According to a more specific embodiment of the invention, the system is further provided with an objective component with the aid of which the night image, for example, is projected on the input of the image intensifier unit. The said image display device may consist of, for example, an LCD or a CRT.

The invention further relates to a helmet provided with such a display system.

Preferably, such a helmet, for the benefit of each eye of a user, is provided with an image intensifier unit (IIT) and an eyepiece, the helmet further being provided with a common image display device for the benefit of one of the eyes or of both eyes. This makes it possible for a user to perceive both the day image and the night image in stereo, i.e. in three dimensions.

3

BRIEF DESCRIPTION OF THE DRAWINGS

The invention will be explained in more detail with reference to the drawing, in which.

DESCRIPTION OF THE INVENTION

Figure 1:
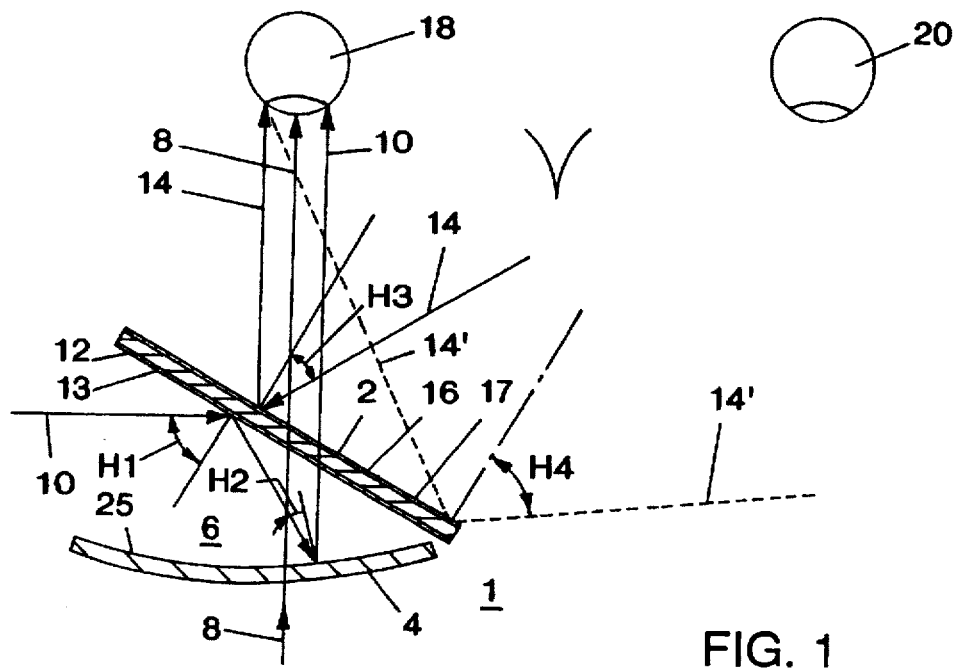
FIG. 1 shows a schematic diagram for a display system according to the invention.

FIG. 1 shows, schematically, a display system 1 which is suitable, for example, for being mounted on a helmet. The display system 1 comprises a first transparent reflecting element 2 having angle- and frequency-dependent reflectance and transmittance properties defined below in more detail in the context of FIGS. 2, 3 and 4. In this example, the first element 2 consists of a flat element, known per se, at least having a holographic layer or multilayer interference filter as will be explained hereafter in more detail. In addition, the display system 1 comprises a second transparent reflecting element 4 having angle- and frequency-dependent reflectance and transmittance properties defined below in more detail in the context of FIGS. 2, 3 and 4. In this example, the second element 4 consists of a concave collimating element 4, known per se, having at least a holographic layer (concave holographic mirror) or multilayer interference filter, as will be explained hereafter in more detail. The two elements 2, 4 together form an eyepiece 6 of the display system 1.

A light ray 8 of a day image in the direction of the eyepiece is transmitted through both the second element 4 and the first element 2. A light ray 10 coming from a night image impinges on a first side 12 of the first element 2 and is reflected thereby in the direction of the second element 4. The light ray 10 is then reflected back by the second element 4 in the direction of the first element 2. The light ray 10 reflected by the second element 4 is transmitted through the first element in a direction identical to that of the light ray 8. Further, a light ray 14 of a video image impinges on a second side 16 of the first element and is likewise reflected thereby in the direction of the light ray 8.

All this results in the day image, night image and video image being blended with one another and being able to be observed by an eye 18 of a user. For the benefit of a second eye 20 of a user, an identical second display system 1 can be used. This makes it possible for the user to perceive the day image and the night image three-dimensionally. The video image can, if required, be imaged to both eyes or to only one eye. In the latter case, the imaging of the video image can be dispensed with in one of the two display systems 1. The display system 1 is provided with means, known per se, for generating the night image and the video image, which means will not be discussed further in connection with FIG. 1.

4

Figure 2:
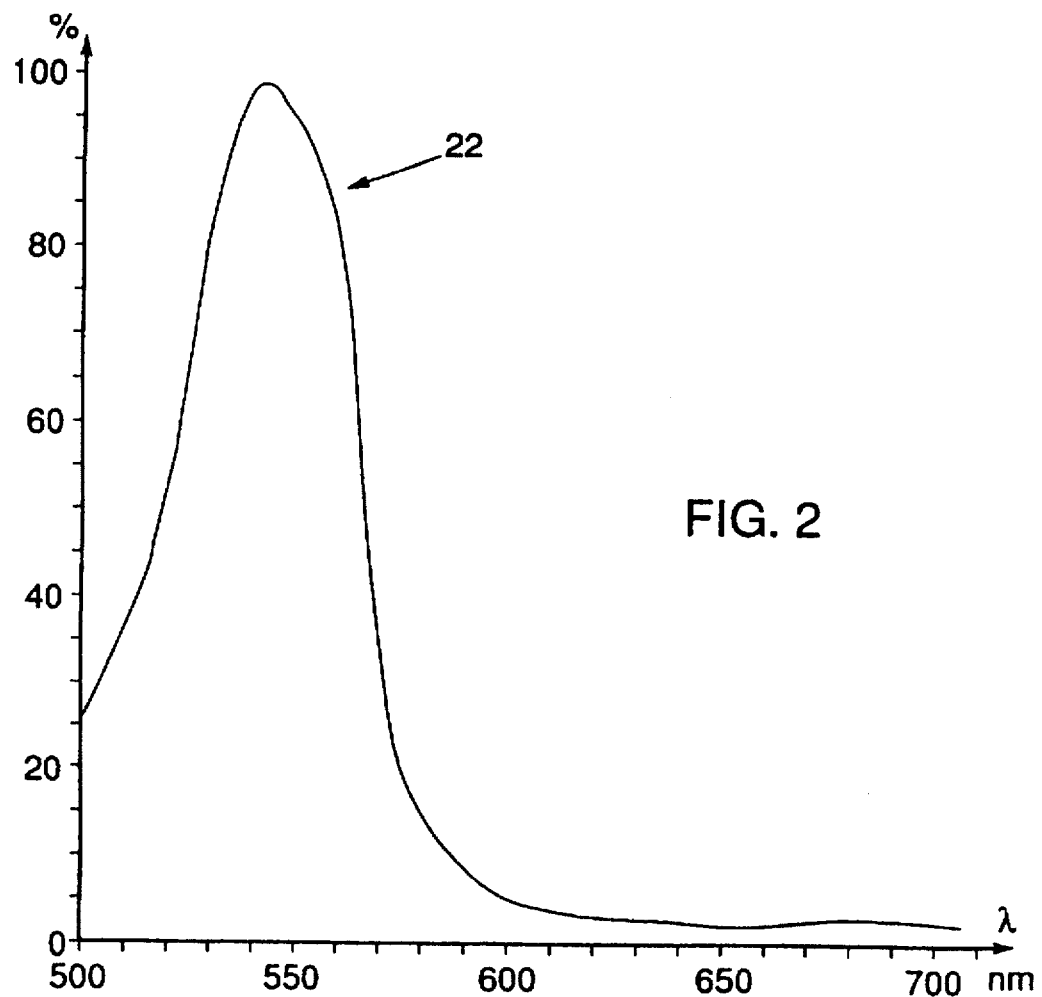
FIG. 2 shows a reflectance characteristic of a first element according to FIG. 1.

FIG. 2 shows the reflectance characteristic 22 of the first side 12 of the first element 2 for light rays which impinge at an angle H1 with respect to the normal of the first side 12. This shows that in this example the first side of the first element has been designed in such a way that light rays having a wavelength of around 550 nm are reflected virtually completely. This property is employed in generating a night image using frequencies which at any rate lie at least within a frequency band comprising wavelengths of around 550 nm. This can be achieved, for example, if generation of the night image, greenish in this case, is effected by means of a phosphor screen known per se.

Figure 3:
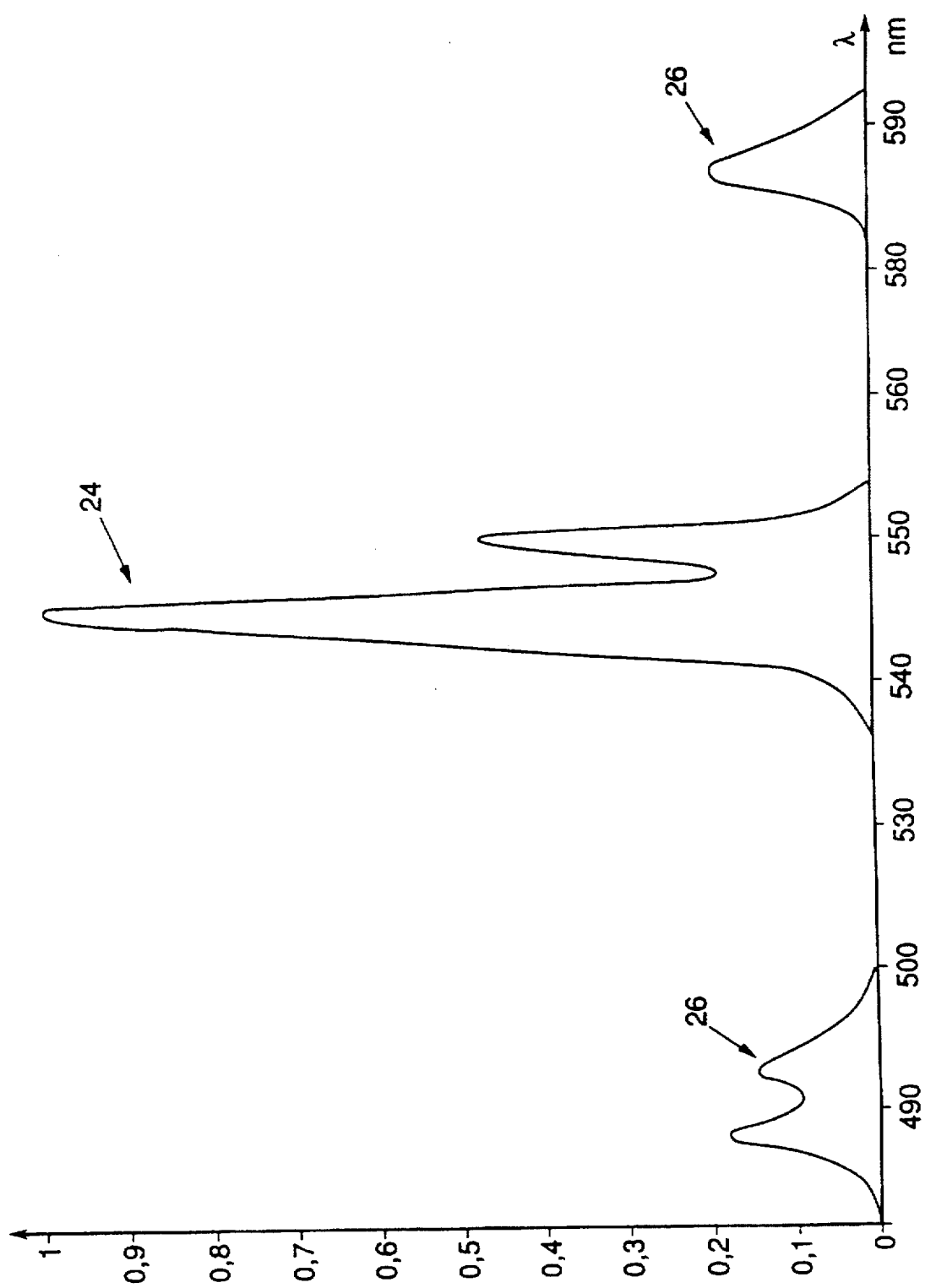
FIG. 3 shows an emission spectrum of a phosphor screen according to FIG. 1.

FIG. 3 shows the emission spectrum of such a phosphor screen, which has a peak 24 at around 550 nm. This explains why the incident light ray 10 is indeed at least mainly reflected by the first element 2. The side bands 26 situated on both sides of the peak 24 are, however, commonly transmitted. To this end, the first side 12 may be provided with a holographic layer 13, known per se, or a multilayer interference filter 13, likewise known per se, on a transparent medium which is shown as hatched in the drawing.

The properties of the second element 4 have been chosen in such a way that a light ray impinging at an angle H2 and having a frequency spectrum comprising a peak at around 550 nm is reflected. To this end, the second element 4 is provided with a holographic layer 25, known per se, or a multilayer interference filter 25 on a transparent medium which is shown as hatched in the drawing, all these arrangements being comparable to what has been discussed with respect to the first element, and not going to be explained here in more detail.

The second side 16 of the first element 2 has reflectance and transmittance properties which are comparable to the properties discussed of the first side 12. In this example, the second side 16 has been designed in such a way that a light ray 14 impinging at an angle H3 is reflected for frequencies which comprise light of a reddish colour. To this end, the second side 16 may be provided with a holographic layer 17, known per se, or a multilayer interference filter, likewise known per se, on a transparent medium shown as hatched in the drawing. Correspondingly, the reflected video image 14 comprises light of a reddish colour. This has the additional advantage that a user is able to readily distinguish the night image, greenish in this example, from the reddish video image. The video image which impinges on the first element 2 will therefore at least comprise a frequency band which at least partially overlaps those frequencies or the frequency band for which, at an angle of incidence H3, reflections occur at the first element 2. This means that the incident video image may, for example, be a black-and-white image. The reddish frequency components of this image are then reflected, and the other components are transmitted through the first element 2.

Figure 4:
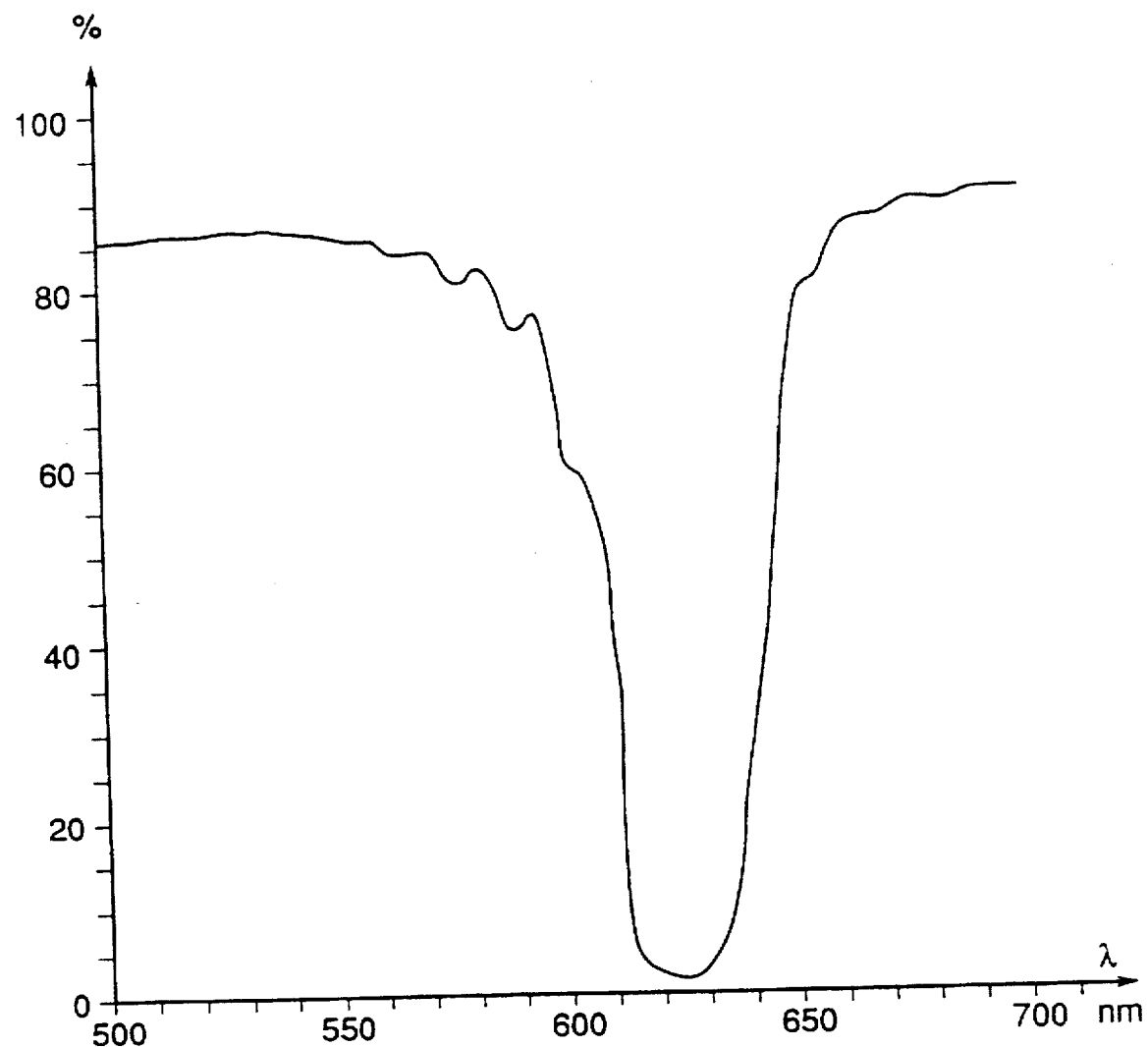
FIG. 4 shows a transmittance characteristic of the first element according to FIG. 1.

FIG. 4 furthermore depicts the transmittance characteristic of the first element 2, when a light ray impinges at an angle which differs from H1 in that it is smaller. This shows that transmission occurs if the wavelength deviates from approximately 625 nm. This explains why the light ray 10 reflected by the second element 4 is transmitted through the first element 2.

The second element 4 has transmittance properties comparable to FIG. 4, so that the daylight—which after all comprises a continuous frequency spectrum—is transmitted virtually in its entirety through the second and first element. Should it be desirable for the video image reflected by the first element 2 to have a colour different from that specified previously—such as, for example, a bluish reflected image 14'—this can be effected by causing the video image 14' to impinge on the first element 2 at an angle H4 which in this example is greater than H1.

In the case of a greater angle H4, reflections of bluish frequency components (second frequency band) then occur, while other frequency components are transmitted through the first element 2. The reflected image 14' will then be bluish. A precondition is of course that the video image 14' impinging on the first element 2 at least comprises frequencies which are reflected by the first element if the angle of incidence is H4. In other words, the last-mentioned frequencies fall at least partially within the second frequency band mentioned earlier.

Figure 5:
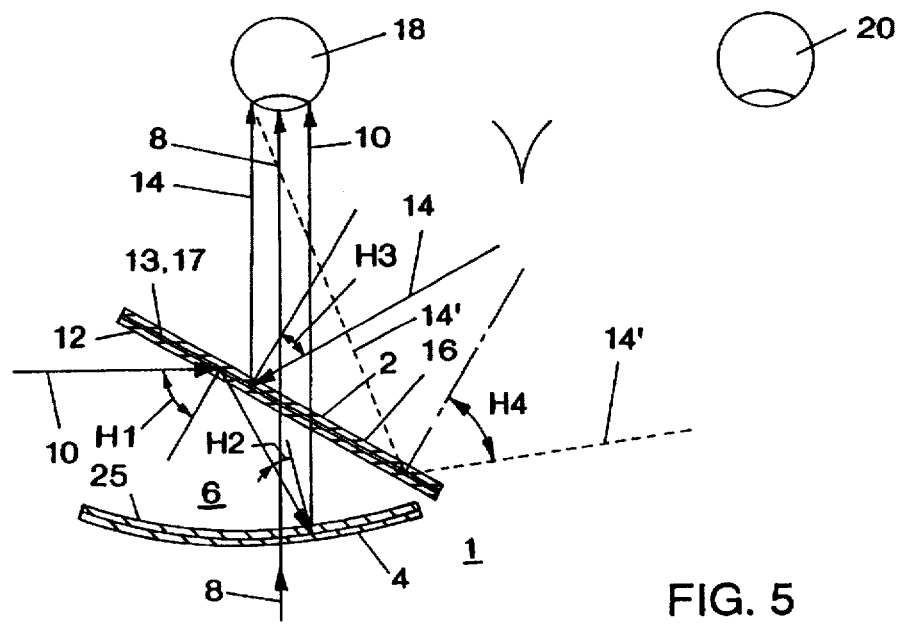
FIG. 5 shows an alternative schematic diagram for a display system according to the invention.

In a particularly advantageous embodiment as shown in FIG. 5, the first element 2 comprises only one single layer having the said angle- and frequency-dependent reflectance and transmittance properties, i.e. the first layer 13 as shown in FIG. 1 and the second layer 17 as shown in FIG. 1 belong to one and the same layer which in FIG. 5 is provided with a reference numeral 13. Owing to the special construction of a holographic layer 13 or multilayer interference filter having the properties as depicted in the FIGS. 2 and 4, the frequency-dependent reflectance and transmittance properties shown in those figures are achieved for one specific angle of incidence such as, for example, the angle H1. If, however, the angle of incidence is different from H1, the corresponding centre frequencies of the peak in FIG. 2 and of the valley in FIG. 4 are likewise different. In particular, a smaller angle of incidence with respect to the normal is associated with a greater wavelength of the centre frequency of the peak in FIG. 2 and of the valley in FIG. 4, all in accordance with the known Bragg relationship. This special property of holographic layers or multilayer interference filters having angle- and frequency-dependent reflectance and transmittance properties can now be advantageously employed in the first element 2 and the second element 4.

As FIG. 5 shows, the angle of incidence with respect to the normal, for the light coming from the image intensifier unit should be different from the angle of incidence with respect to the normal of the light from the video image, so as to make it possible to ensure that the emergence direction of both the night vision image and of the video image are the same. The angles in question are designated in FIG. 5 by H1 and H3, respectively. If then, for element 2, use is made of only one holographic layer 13 or multilayer interference filter 13 in order to obtain the angle- and frequency-dependent reflectance and transmittance properties for both the reflection on the one side 12 of the night vision image 10 and the reflection on the other side 16 of the video image 14, it follows from the above that those reflections occur at different wavelengths. Specifically, since angle H1 is greater than angle H3, the corresponding centre wavelength of the night vision image is smaller than the corresponding centre wavelength of the video image, in other words a greenish night vision image is associated with a reddish video image. The embodiment described here and shown in FIG. 5, having only one holographic layer 13 or multilayer interference filter 13, not only has the advantage of only one layer having angle- and frequency-dependent reflectance and transmittance properties having to be applied to a substrate, but also that the night vision image and the video image are reflected in colours (greenish and reddish, respectively) of which studies have shown that it is precisely those two colours which, as contrasting colours in a combined image, result in particularly good separate perception of each of the two (the greenish and the reddish, respectively) images. The embodiment described here is thus not only less critical in its fabrication (only one holographic layer or multilayer interference filter has to be fabricated), but at the same time one of the best-known colour contrasts (green-red) thus has been accomplished for the night vision image and the video image. In this example, the layer or filter 13 has been incorporated in a transparent medium which is shown as hatched in the drawing. Likewise, the layer 25 has been incorporated in a transparent medium which in the drawing is shown as hatched. In order to obtain, for example, a bluish reflected video image 14', the angle of incidence can, for example, be equal to H4, as discussed in connection with FIG. 1.

Figure 6:
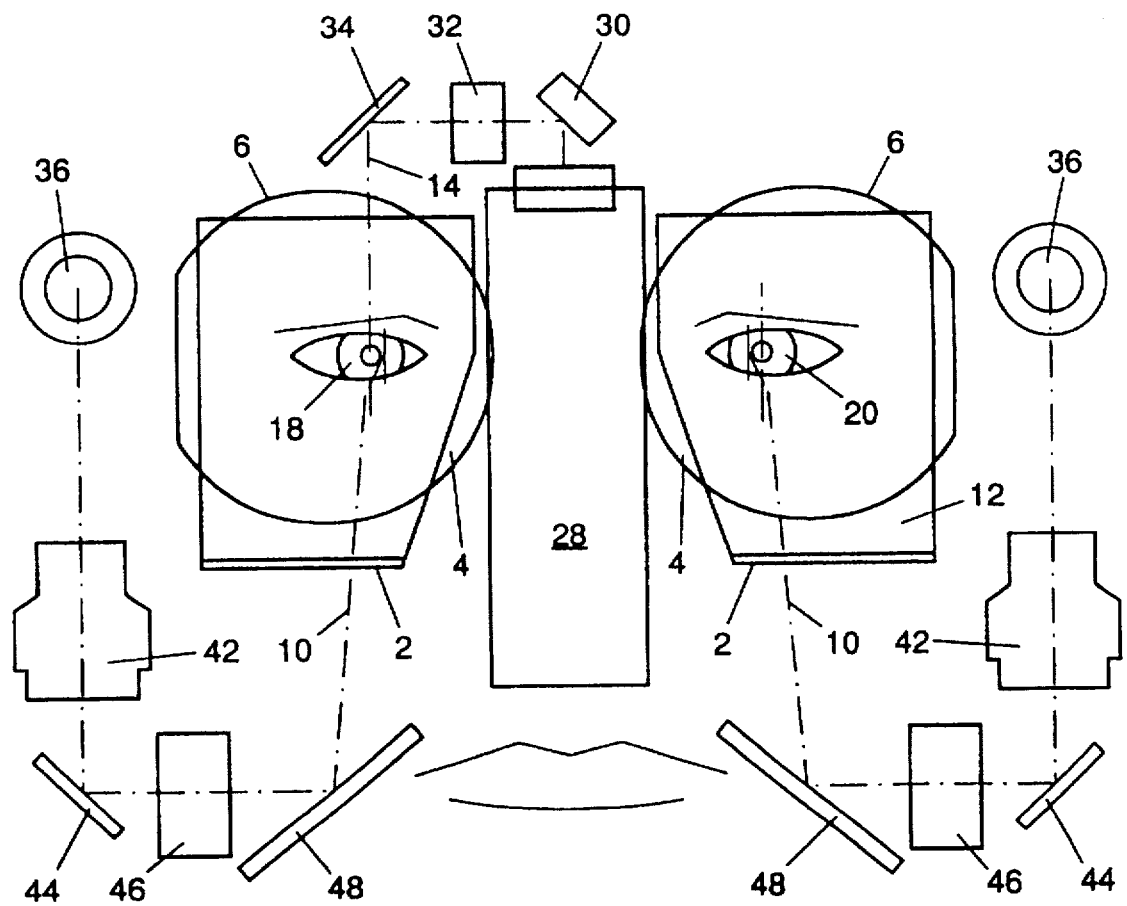
FIG. 6 shows a front view of a display system which is mounted on a helmet.

With reference to the FIGS. 6, 7 and 8, a possible embodiment of a display system for a helmet will now be discussed. Herein, the parts corresponding to FIGS. 1 and 5 are provided with identical reference numeral.

The display system comprises, in addition to the components discussed in FIGS. 1 and 5, a CRT 28 by means of which a video image 14 comprising information is generated. The video image 14 is presented to the eye via a mirror 30, an objective 32, a mirror 34 and the first element 2. This means that the video image 14, after reflection at the second side 16 of the first element 2, can be observed by means of the eye 18 at a certain distance.

The display system is further provided, for each eye, with an objective 36 by means of which a night image can be projected on an input of an image intensifier tube (sometimes designated IIT). The IIT 38 enhances the intensity of the image which is then retransmitted at an output of the IIT 38. The night image thus obtained is directed, via a mirror 40, a lens system 42, a mirror 44, a lens system 46 and a mirror 48, in the direction of the eyepiece 6, these components being matched to one another in such a way that the night image 10 is formed at infinity. This means that the night image, after reflection at the first element 2 and the second element 4, and transmission through element 2, can be observed by eyes 18, 20 fixed on infinity. This ensures that night image 10 and day image 8 are perceived as superimposed. This is particularly convenient for a user, because day image and night image merge with one another in a natural way.

Figure 7:
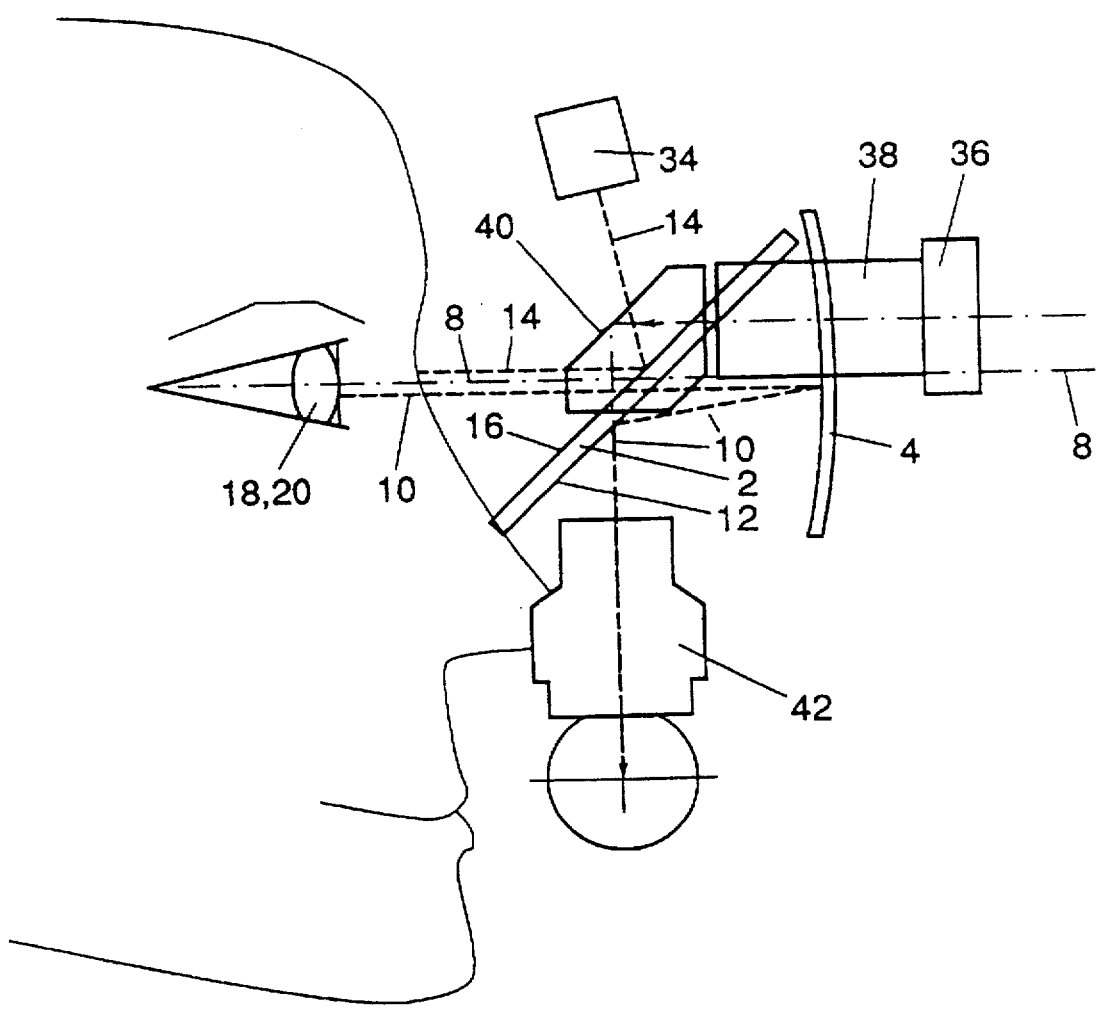
FIG. 7 shows a side view of a part of the display system of FIG. 6.
Figure 8:
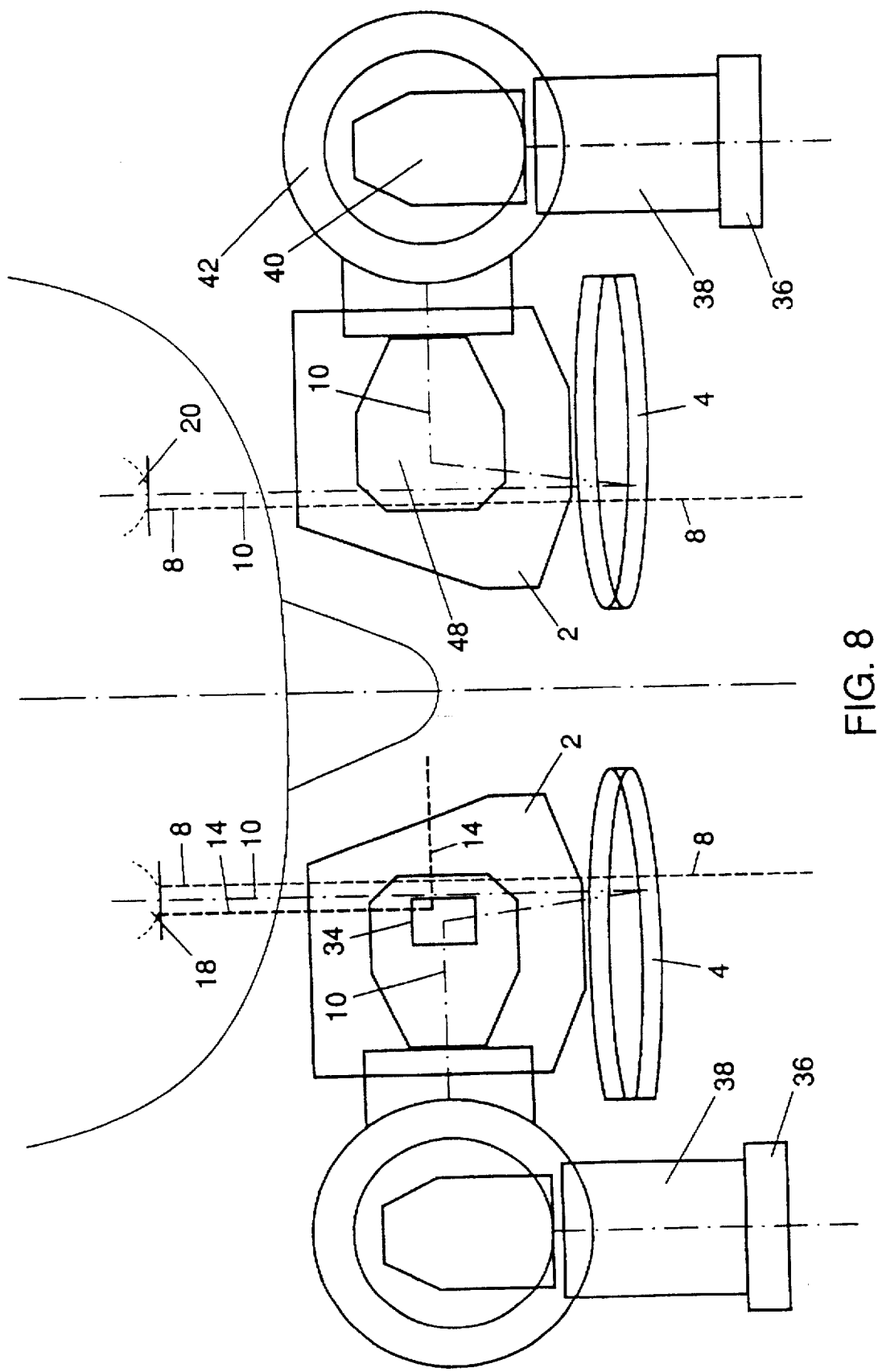
FIG. 8 shows a top view of a part of the display system of FIG. 6.

For the sake of clarity, the CRT 28, mirror 30 and objective 32 have been omitted in FIGS. 7 and 8.

Moreover, a user will generally not see the video image, projected at a certain distance, in focus at the same time as the day and night image, because the latter two are generally situated far away. The IIT 38 in this example comprises a phosphor screen which generates a greenish image, while the video image generated by the CRT has a reddish colour. As a result, the probability of these two images creating a confusing impression to a user is particularly small.

An advantage of the display system is that the relatively high resolution of the IIT 38 is retained. An IIT can also be replaced by integral CCD cameras having, for example, CRT displays.

However, it is also possible to use an LCD instead of a CRT. Since an LCD has a frequency spectrum different from that of a CRT, the first side 12 of the first element 2, and the second element 4 will have to be adjusted accordingly. On the basis of the relationship, already described above, between the angle of incidence with respect to the normal, and centre frequencies of the reflected light, it is of course also possible to change the position of the CRT or LCD. It is also possible to manufacture a display system according to a so-called mono version, according to which example the right-hand components of FIG. 6 are omitted, so that, in principle, the display system according to FIGS. 1 or 5 remains.

I claim:

1. A display system which comprises:

an eyepiece comprised of a first and second transparent reflecting element having angle- and frequency-dependent reflectance and transmittance properties;

an image intensifier unit including an input for receiving an image and an output for projecting an intensified enhanced image within a predetermined first frequency band, said properties of said eyepiece in combination with said predetermined first frequency band providing an intensified-image emerging from said eyepiece in a direction of an eye of a user; and an image display device means for transmitting a visible video image is in a direction of said eyepiece to provide a video image within a second frequency band emerging from said eyepiece in said direction of said eye, thereby blending day, night and video images.

2. The display system as defined in claim 1 wherein said video image comprises frequencies partially within said second frequency band.

3. The display system as defined in claim 1 wherein said second transparent reflecting element is collimating.

4. The display system as defined in claim 3 wherein said intensity-enhanced image is, successively, reflected by said first transparent reflecting element and reflected and collimated by said second transparent reflecting element, and is then transmitted through said first transparent reflecting element.

5. The display system as defined in claim 1 wherein said visible video image is reflected by said first transparent reflecting element.

6. The display system as defined in claim 5 wherein said intensified-enhanced image and said visible video image, respectively, impinge on different sides of said first transparent reflecting element.

7. The display system as defined in claim 6 wherein an angle of incidence (H1) of said intensified-enhanced image differs from an angle of incidence (H3) of said visible video image on said first transparent reflecting element.

8. The display system as defined in claim 1 wherein a daylight image is successively transmitted through said second transparent reflecting element and said first transparent reflecting element and emerges from said eyepiece in a direction virtually identical to said direction of said emerging intensified image.

9. The display system as defined in claim 1 wherein said first transparent reflecting element includes a holographic layer.

10. The display system as defined in claim 1 wherein each side of said first transparent reflecting element includes a holographic layer.

11. The display system as defined in claim 1 wherein said first transparent reflecting element comprises a multilayer interference filter.

12. The display system as defined in claim 1 wherein each side of said first transparent reflective layer comprises a multilayer interference filter.

13. The display system as defined in claim 1 wherein said first transparent reflective layer comprises only one multilayer interference layer.

14. The display system as defined in claim 1 wherein said second transparent reflective element comprises a holographic concave mirror.

15. The display system as defined in claim 1 wherein said second transparent reflective element comprises a curved multilayer interference filter.

16. The display system as defined in claim 1 wherein said first frequency band comprises higher frequencies than said second frequency band.

17. The display system as defined in claim 16 wherein said first frequency band comprises light mainly of a greenish color and said second frequency band comprises light mainly of a reddish color.

18. The display system as defined in claim 1 and further including an objective component means for aiding in projecting said image on said input of said image intensifier unit.

19. The display system as defined in claim 1 wherein said image display device means comprises a LCD or a CRT.

20. The display system as defined in claims 7 or 14 where said first transparent reflecting element comprises only one holographic layer.

* * * * *